United States Patent [19]

Abdo

[11] 4,450,084

[45] May 22, 1984

[54] OIL RECOVERY PROCESS EMPLOYING A NON-IONIC GLUCAN IN COMBINATION WITH CLAY FLOCCULANT

[75] Inventor: Milton K. Abdo, Dallas, Tex.

[73] Assignee: Mobil Oil Corporation, New York, N.Y.

[21] Appl. No.: 386,461

[22] Filed: Jun. 8, 1982

Related U.S. Application Data

[63] Continuation-in-part of Ser. No. 229,372, Jan. 29, 1981, Pat. No. 4,347,146.

[51] Int. Cl.³ .............................................. E21B 43/22
[52] U.S. Cl. .................................. 252/8.55 D; 166/275
[58] Field of Search ................... 252/8.55 D; 166/274, 166/275

[56] References Cited

U.S. PATENT DOCUMENTS

| | | | |
|---|---|---|---|
| 3,116,791 | 1/1964 | Sandiford | 166/274 |
| 3,372,749 | 3/1968 | Williams | 166/274 |
| 3,478,823 | 11/1969 | Murphy | 166/274 |
| 3,634,305 | 1/1972 | Johnson et al. | 166/274 X |
| 3,804,173 | 4/1974 | Jennings | 252/8.55 X |
| 3,919,092 | 11/1975 | Norton et al. | 166/274 X |
| 4,043,396 | 8/1977 | Kudchadker et al. | 166/274 |
| 4,269,270 | 5/1981 | Kalfoglou | 252/8.55 X |

*Primary Examiner*—Herbert B. Guynn
*Attorney, Agent, or Firm*—A. J. McKillop; M. G. Gilman; J. F. Powers, Jr.

[57] ABSTRACT

Certain glucans are made useful as mobility control agents in subterranean oil recovery by the addition of clay flocculant to minimize adsorption loses. Because of the non-ionic character of glucans, these loses are excessive in the absence of the flocculants used herein.

2 Claims, No Drawings

OIL RECOVERY PROCESS EMPLOYING A NON-IONIC GLUCAN IN COMBINATION WITH CLAY FLOCCULANT

CROSS-REFERENCE TO RELATED APPLICATION

This application is a continuation-in-part of a copending U.S. application, Ser. No. 229,372, filed Jan. 29, 1981, now U.S. Pat. No. 4,347,146.

BACKGROUND OF THE INVENTION

1. Field of the Invention

This invention relates to producing petroleum from a petroleum-containing subterranean formation employing a glucan. In particular, the glucan is employed with a clay flocculant.

2. Description of the Prior Art

Processes for the production of petroleum from a petroleum-containing subterranean formation employing an aqueous driving fluid containing a thickening agent is well known. U.S. Pat. No. 3,020,207 discloses such a process where the thickening agent is a heteropolysaccharide that has been reacted with an aldehyde, the heteropolysaccharide being a fermentation product produced by the action of bacteria of the genus Xanthomonas upon a carbohydrate. U.S. Pat. No. 3,352,358 discloses a process employing thickened aqueous driving fluid where the thickening agent is polyvinyl alcohol sulfate. U.S. Pat. No. 3,372,749 also discloses a process employing thickened aqueous driving fluid where the thickening agent is a poly(glucosylglucan). In the process disclosed in U.S. Pat. No. 3,373,810, the thickening agent for the aqueous driving fluid is sulfoalkylated poly(glucosylglucan), a sulfoalkylated polysaccharide or a mixture of both, the polysaccharide being the heteropolysaccharide produced by the action of the bacterium *Xanthomonas coampestris* on glucose.

SUMMARY OF THE INVENTION

In accordance with the invention there is provided a process for producing petroleum from a petroleum-bearing subterranean formation wherein an aqueous driving fluid containing a glucan thickening agent is injected into said formation through an input well and passed through the formation to an output well, the improvement comprising employing a clay flocculant in combination with said glucan to minimize glucan adsorption loss.

DESCRIPTION OF SPECIFIC EMBODIMENTS

Liquid petroleum accumulated within a subterranean formation can be produced, or recovered, therefrom through wells leading from the surface of the earth to the formation using the natural energy within the formation. However, the natural energy in the formation is insufficient to recover all of the petroleum and becomes rapidly depleted. Thus, a large amount of the petroleum is left in a subterranean formation if only the natural energy is used to produce the petroleum. This production by depletion of the natural energy is often referred to as primary production. Where natural energy has become depleted, supplemental operations, often referred to as secondary recovery operations, or tertiary if there is more than one such supplemental operation, are used to improve the extent of recovery of the petroleum. In the most successful and most widely used supplemental recovery operation, a fluid is injected through an injection means comprising one or more input wells. The fluid enters the formation and passes through the formation in the direction of a production means comprising one or more output wells. The fluid displaces the petroleum within the formation and the petroleum passes through the formation along with the fluid in the direction of the output means. The petroleum is produced from the production means. In a particular supplemental recovery operation of this sort, an aqueous driving fluid is employed and the operation is referred to as waterflooding.

While waterflooding is effective in obtaining additional petroleum from a petroleum-containing subterranean formation, it has a number of shortcomings. Foremost among these shortcomings is the tendency of the aqueous driving fluid to "finger" through the petroleum-containing formation and thus bypass substantial portions of the formation. By "fingering" is meant the development of unstable bulges or stringers which advance toward the production means more rapidly than the remainder of the aqueous driving fluid.

It has been established that waterfloods perform less satisfactorily with viscous petroleum than with relatively nonviscous petroleum. The fingering tendencies of the aqueous driving fluid are more or less directly related to the ratio of the viscosity of the petroleum to the viscosity of the aqueous driving fluid. The viscosities of different petroleums vary from as low as 1 or 2 centipoises (0.001 to 0.002 pascal-second) to 1000 centipoises (1 pascal-second) or higher whereas water has a viscosity of about 1 centipoise (0.001 pascal-second).

The relationship between the mobility of the petroleum and of the aqueous driving fluid in a particular formation is related to their respective viscosities according to the following equation:

$$M = \frac{K_a}{\mu_a} / \frac{K_p}{\mu_p} = \left(\frac{\mu_p}{\mu_a}\right)\left(\frac{K_a}{K_p}\right)$$

where
  M is the mobility ratio,
  $\mu_p$ is the viscosity of the petroleum,
  $\mu_a$ is the viscosity of the aqueous driving fluid,
  $K_a$ is the relative permeability of the formation to the aqueous driving fluid in the presence of the petroleum which remains in the formation after passage of the aqueous driving fluid, and
  $K_p$ is the relative permeability of the formation to the petroleum in the presence of the connate water in the formation.

In a subterranean formation containing petroleum having a high viscosity, in order to achieve a mobility ratio of 1, i.e., where the aqueous driving fluid and the petroleum move through the formation with equal facility and fingering is thus minimized, the viscosity of the aqueous driving fluid must be increased. In the absence of severe differences in the relative permeabilities of the petroleum and of the aqueous driving fluid, the mobility ratio is essentially equal to the viscosity ratio.

Past suggestions for increasing the viscosity of the aqueous driving fluid have included incorporating water-soluble thickening agents in the aqueous driving fluid. Some of these agents were mentioned herein in connection with the discussion of the prior art. With respect to the present invention, the glucans disclosed in U.S. Pat. No. 3,372,749 is the closest art known by applicant.

While glucans are known to be effective in increasing the viscosity of the flooding water, they also are characterized by a serious disadvantage. There is usually unacceptable adsorption loss caused by their non-ionic character. The adsorption loss reverses the increase in viscosity, and decreases the effectiveness of glucans as mobility control agents. Glucan adsorption loss is practically eliminated by the use, either before or with the glucan thickened water, of a clay flocculant which acts as a sacrificial agent. Because of their specific adsorptive property, only trace quantities of flocculant are needed to "blanket" the adsorptive sites of rock, thereby minimizing glucan loss.

Oil is recovered from an oil-containing subterranean formation penetrated by an injection means and a production means by injecting through the injection means and into the formation flooding water which has been thickened by addition of a poly(glucosylglucan), the glycosylglucan having the following structural formula:

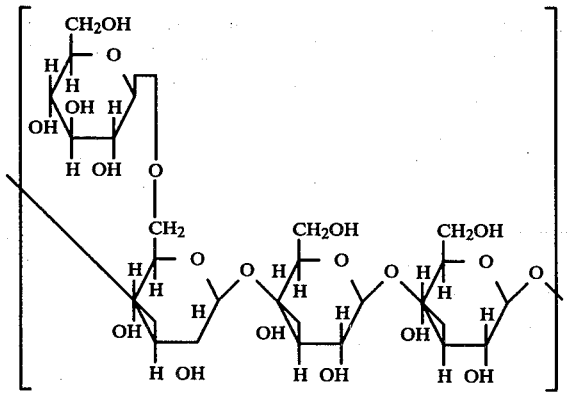

As illustrated in the formula, the glucosylglucan repeating unit comprises multiple glucose molecules which are linked beta 1 to 3 to form the chain skeleton. Onto each third glucose molecule there is appended a glucose molecule linked beta 1 to 6. As used herein, the term "solutions" incorporates dispersions which do not deposit filter cake upon injection into a core sample of a subterranean formation, whether or not the dispersions are true solutions. Also, the term "thickened water" is used to denote the flooding water which has been thickened by addition of a poly(glucosylglucan).

The larger the number of repeating units in the poly(glucosylglucan), i.e., the higher the molecular weight, the higher will be the viscosity of an aqueous solution containing a given weight percent of it. For waterflooding, the molecular weight should be high enough to afford a relatively large increase in the viscosity of the flooding water at a relatively minute concentration. Ordinarily, the poly(glycosylglucan) employed should have a molecular weight such that its 1 percent by weight aqueous solution has a viscosity at 24° C. of from 2,000 to 3,000 centipoises when tested at 30 revolutions per minute on a Brookfield viscometer using a No. 3 spindle. Preferably, it should have a molecular weight such that its 1 percent by weight aqueous solution has the comparable viscosity of about 2,600 centipoises. On the other hand, a poly(glucosylglucan) having a molecular weight such that its 1 percent by weight aqueous solution has the comparable viscosity as low as 500 centipoises may be employed. However, a concentration disproportionately greater than that of the higher molecular weight poly(glucosylglucan) is necessary to afford the same viscosity in the thickened flooding water.

An effective glucan is one that is commercially available as "Polytran". The sample used in the examples illustrated herein was a diluted broth supplied by Ceca S.A., and is called Actigum CS-11.

The glucan is employed in the flooding water in a concentration sufficient to increase the viscosity of the flooding water. In rare instances, a concentration as small as 0.005 percent by weight of the glucan in the flooding water will be satisfactory. Usually, a concentration of from about 0.01 to about 0.3 percent by weight is employed. The preferred concentration range is from about 0.03 to about 0.1 percent by weight. In rare instances in which it is desired to partially plug an extremely permeable strata within a subterranean formation, it may be desirable to employ as high as 1 percent by weight, or more, of the poly(glucosylglucan) in the flooding water.

The thickened flooding water may comprise the entire flooding liquid displacing the oil within the subterranean formation toward the production means. Ordinarily, however, a slug of thickened flooding water of from about 0.01 to about 0.25 pore volume will prove to be economically advantageous in recovering the oil from the subterranean formation.

Illustrative surfactants which may be employed in either the water or the miscible liquid, or both, are petroleum sulfonates or alkylphenoxypoly(ethyleneoxy)-ethanols. The alkali metal salts of the petroleum sulfonates having a molecular weight of from about 300 to about 500 are soluble to an adequate extent in both the aqueous solutions and the miscible liquids and may be employed. Also suitable as surfactants are the alkylphenoxypoly(ethyleneoxy)ethanols in which the alkyl group contains 8 to 9 carbon atoms and in which the poly(ethyleneoxy) group contains 3 to 5 ethyleneoxy groups. These alkylphenoxypoly(ethyleneoxy)ethanols are soluble to an adequate extent in both the aqueous solutions and the miscible liquids.

A concentration of surfactant is employed which will effect lowered interfacial tension between the thickened flooding water and the oil, or the miscible liquid, it displaces within the subterranean formation. Ordinarily, a concentration of from about 0.01 to about 1.0 percent by weight of surfacent is required in the thickened flooding water or in the miscible liquid to be effective.

Water thickened by the addition of the poly(glucosylglucan) retains its viscosity in the presence of brines, either sodium chloride or calcium chloride brines. Further it does not form precipitates with divalent ions such as calcium or with trivalent ions such as chromium.

The clay flocculant used may be selected from several materials. Some that may be mentioned are unhydrolyzed polyacrylamides and Polyox coagulant, a long chain ethylene oxide compound. Polyox is the tradename for polyethylene oxide manufactured by Union Carbide Corporation, Danbury, Conn. The flocculant can be employed in the flooding water to the extent of from about 0.5 ppm to about 100 ppm by weight, preferably about 5 ppm to about 50 ppm. As described in U.S. Pat. No. 4,088,453 to Patel et al and U.S. Pat. No. 4,302,326 to Bialek, Polyox has a molecular weight of about 100,000 to 7,000,000, and has the structure (—O—CH$_2$—CH$_2$—)n, wherein n is about 200 to 100,000.

The polyacrylamide used in the present invention must be unhydrolyzed. For convenience these flocculants can be identified by the weight average molecular weight, which preferably ranges from about 1 to about 7 million.

Having thus described the invention in broad, general terms, the following will provide specific illustrations. It will be understood that they are given by way of illustration only, without any intention thereby to limit the scope of the invention. Reference for the latter purpose should be made to the appended claims.

EXAMPLES

As was stated hereinabove, the glucan used was a pretreated sample of Polytran, called Actigum CS-11, which has a molecular weight of about 1 million. The Polytran used came from a raw broth supplied by Ceca S.A., and had viscosity active portion of about 1.6 percent by weight of the broth. The cellular debris of the raw broth was removed by filtration through a diatomaceous earth bed. In this filtration step, the raw broth was diluted about ten to one with tap water to yield the 1600 ppm glucan fluid. The raw fermentate (about 1.6 percent active) was homogenized and diluted with tap water before diatomaceous earth filtration for cell debris removal. The final liquid product does not plug 0.8 micron filters. The reported analysis for the sample was 1610 ppm Polytran, and our determination (isopropanol precipitation, gravimetric analysis, dry basis) was 1800 ppm active polymer.

The flocculant used was a non-ionic unhydrolyzed polyacrylamide known as one of the "PAM" products by the Dow Chemical Company, and having the repeating chain unit:

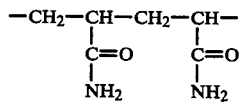

and a molecular weight of between 3 and 5 million.

The clays used were Bentonite and the Kaolinite-Illite fraction of crushed Berea cores. This fraction is the portion which passes 325 mesh screens, and a cursory analysis indicated that it contained about 10 percent silica.

The Polytran or Polytran plus clay flocculant were contacted with varying quantities of clay for various time periods. The viscosity loss during such time periods was the criterion for measuring the amount of protection against adsorption loss. A Brookfield Viscometer with a UL adapter was used to measure viscosity at 25° C. (77° F.), except, where noted in Table 1, it was measured at 32° C. (90° F.).

TABLE 1

| Clay | Solvent | Flocculant ppm | Time, Days | Polytran Adsorbed, mg/gm | |
|---|---|---|---|---|---|
| | | | | Clay | WB Rock |
| Berea | distilled water | 0 | 4 | 3.2 | |
| Berea | 1 percent Nacl soln. | 0 | 4 | 3.1 | |
| | | | 15 | 5.2 | |
| Bentonite | distilled water | 0 | 2 | 94 | |
| Bentonite | 1 percent NaCl soln. | 0 | 3 | 30.6 | |

TABLE 1-continued

| Clay | Solvent | Flocculant ppm | Time, Days | Polytran Adsorbed, mg/gm | |
|---|---|---|---|---|---|
| | | | | Clay | WB Rock |
| | | | 4 | 40.1 | |
| Berea | 1 percent NaCl soln. | 1 or 5 | 163 | 2.6 | 0.13 |
| | 10 percent Nacl soln. | 1 | 163 | 2.8 | 0.14 |
| Bentonite | 1 percent Nacl soln. | 5 | 165 | 15.9 | 0.13 |
| Bentonite | 25 percent WB* water | 10 | 177 | 6.4 | 0.053 |
| Bentonite | 50 percent WB water | 12 | 164 | 4.7 | 0.039 |
| Filtered, at 90° F. West Burkburnett Temperature | | | | | |
| Bentonite | 50 percent WB water | 12 | 223 | 10.0 | 0.083 |
| Sheared, Filtered, at 90° F. West Burkburnett (WB) Temperature | | | | | |
| Bentonite | 50 percent WB water | 12 | 223 | 10.0 | 0.083 |

*contained 1920 mg/l of magnesium, mg/l of calcium and 51,500 mg/l of sodium

It is evident that there is a decrease in lost glucan when small amounts of flocculants are used. While not evident from the data presented, it is nonetheless true that glucans, and Polytran in particular, are not complexed by the presence of trace amounts of trivalent ions. Further, the glucans are stable in the presence of other components, and have been found to be not affected by, for example, surfactants in the recovery system.

The following example, Table 2, illustrates the use of Polyox as the clay flocculant:

TABLE 2

| Clay | Solvent | Polyox ppm | Time, Days | Polytran Adsorbed, mg/gm | |
|---|---|---|---|---|---|
| | | | | Clay | WB Rock |
| Bentonite | 1 percent NaCl soln.* | 0 | 4 | 40.1 | |
| Bentonite | 1 percent NaCl soln.* | 10 | 778 | 174 | 1.43 |

*contained 25 ppm Dowicide B, Tradename for sodium trichloro phenolate manufactured by Dow Chemical Company.

What is claimed is:

1. In an improved process for producing petroleum from a petroleum-bearing subterranean formation wherein an aqueous driving fluid containing a poly(glycosylglucan) thickening agent, the glycosylglucan having the structural formula:

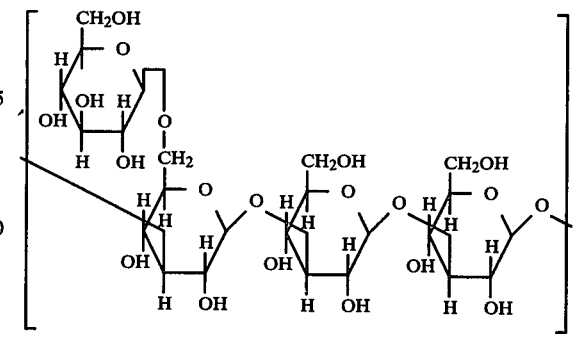

is injected into said formation through an input well and passed through the formation to an output well, the improvement comprising employing in combination with said poly(glycosylglucan) between about 5 ppm and about 50 ppm of a sacrificial clay flocculant which is a long chain polyethylene oxide, having a molecular weight of about 100,000 to 7,000,000 and the structure (—O—CH$_2$—CH$_2$—)n wherein n is about 200 to 100,000, whereby adsorption of said poly(glycosylglucan) by clays is minimized.

2. The improved process of claim 1 wherein the poly(glycosylglucan) has a molecular weight such that a 1 percent by weight aqueous solution thereof has a viscosity of from about 500 to about 3000 centipoises.

* * * * *